(No Model.)  7 Sheets—Sheet 1.

D. F. GRAHAM.
HAY RAKE AND LOADER.

No. 566,308.  Patented Aug. 25, 1896.

Fig. 1

WITNESSES:
Frank M. Burnham.
Chas. I. Welsh.

INVENTOR
David F. Graham
BY
ATTORNEY (No Model.) 7 Sheets—Sheet 2.

D. F. GRAHAM.
HAY RAKE AND LOADER.

No. 566,308. Patented Aug. 25, 1896.

Fig. 2

WITNESSES:
Frank M Burnham
Chas. I. Welch

INVENTOR
David F Graham
BY 
ATTORNEY (No Model.)  7 Sheets—Sheet 3.

D. F. GRAHAM.
HAY RAKE AND LOADER.

No. 566,308. Patented Aug. 25, 1896.

WITNESSES:
Frank M. Burnham.
Chas. I. Welch

INVENTOR
David F. Graham
BY

ATTORNEY (No Model.) 7 Sheets—Sheet 4.

D. F. GRAHAM.
HAY RAKE AND LOADER.

No. 566,308. Patented Aug. 25, 1896.

WITNESSES:
Frank M. Burnham
Chas. J. Welch

INVENTOR
David F. Graham
BY
ATTORNEY (No Model.)  7 Sheets—Sheet 6.

D. F. GRAHAM.
HAY RAKE AND LOADER.

No. 566,308. Patented Aug. 25, 1896.

Fig. 8

Witnesses
G. M. Gridley
Chas. I. Welch

Inventor
David F. Graham
By his Attorney (No Model.)  7 Sheets—Sheet 7.

D. F. GRAHAM.
HAY RAKE AND LOADER.

No. 566,308. Patented Aug. 25, 1896.

WITNESSES:
Frank McBurnham
Chas. I. Welch

INVENTOR
David F. Graham
BY
ATTORNEY

UNITED STATES PATENT OFFICE.

DAVID F. GRAHAM, OF SPRINGFIELD, OHIO, ASSIGNOR OF ONE-HALF TO THE STODDARD MANUFACTURING COMPANY, OF DAYTON, OHIO.

HAY RAKE AND LOADER.

SPECIFICATION forming part of Letters Patent No. 566,308, dated August 25, 1896.

Application filed May 16, 1895. Serial No. 549,543. (No model.)

*To all whom it may concern:*

Be it known that I, DAVID F. GRAHAM, a citizen of the United States, residing at Springfield, in the county of Clark and State of Ohio, have invented certain new and useful Improvements in Hay Rakes and Loaders, of which the following is a specification.

My invention relates to improvements in hay rakes and loaders, and it also relates particularly to improvements on the devices shown and described in my prior patent, No. 532,744, dated January 15, 1895.

My invention consists in the various constructions and combinations of parts hereinafter described, and set forth in the claims.

In the accompanying drawings.

Like parts are represented by similar letters of reference in the several views.

Figure 1:
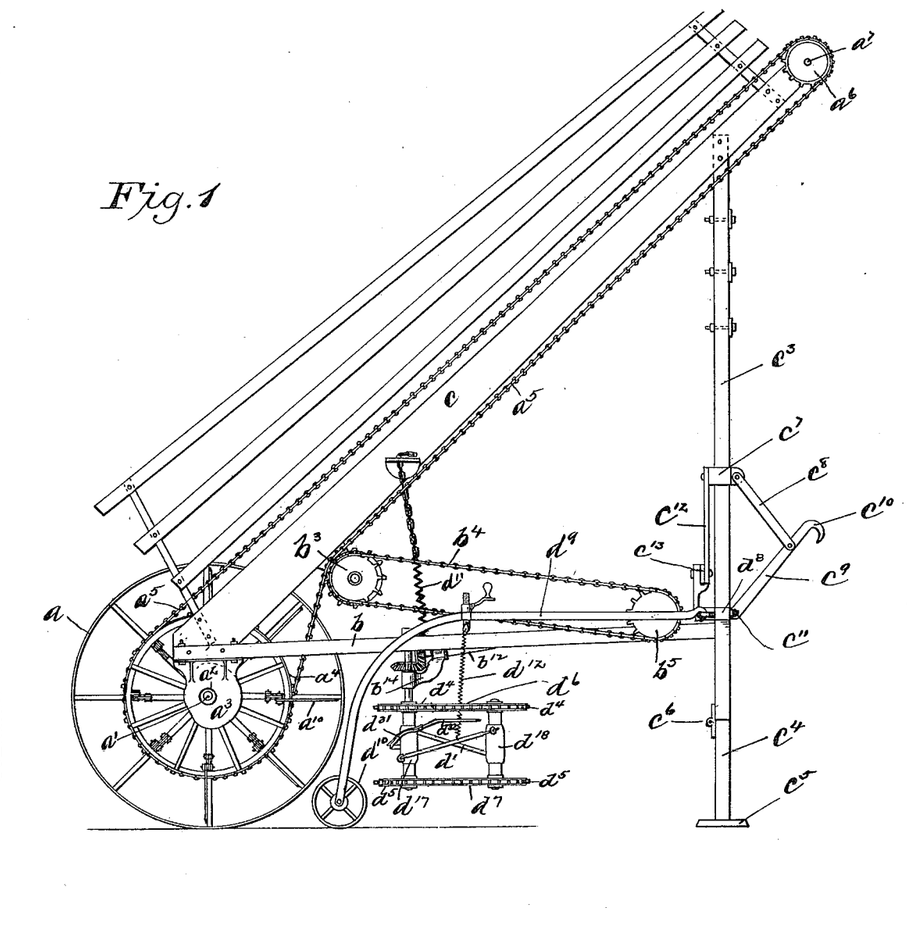
Figure 1 is a side elevation of a device embodying my invention.
Figure 2:
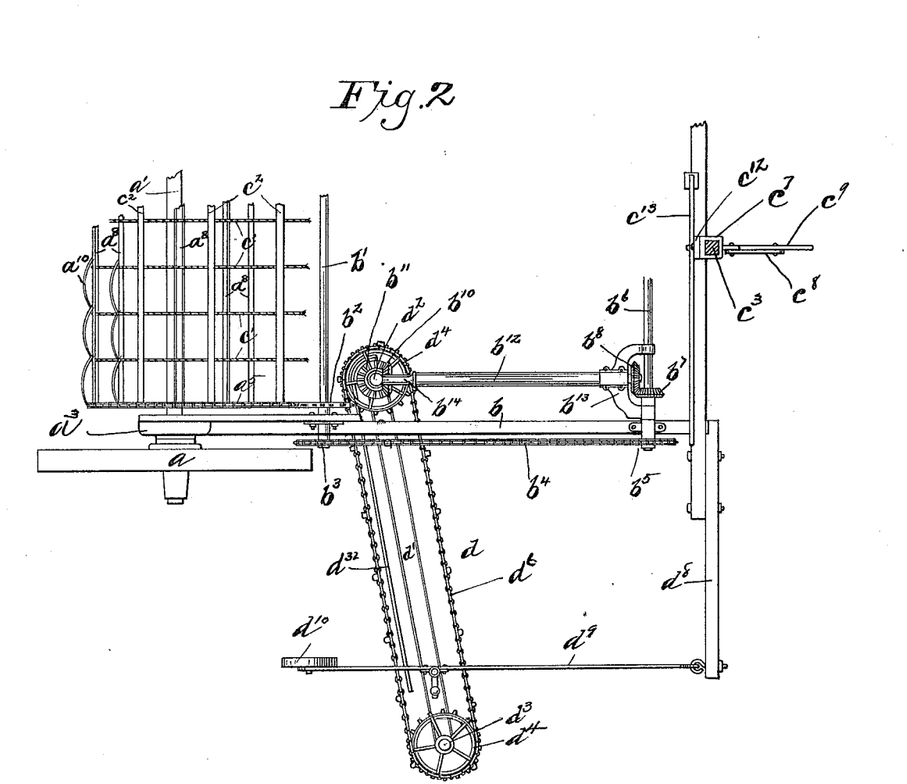
Fig. 2 is a plan view of a portion of the same.
Figure 3:
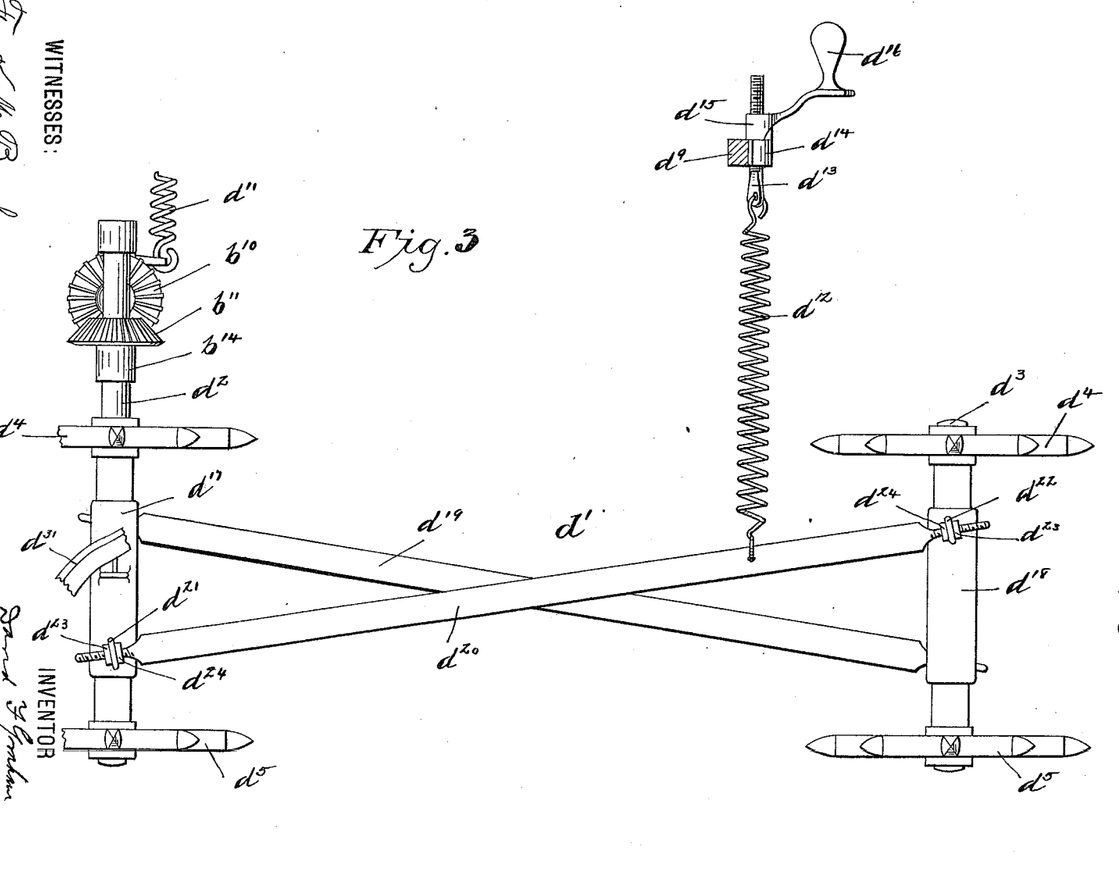
Fig. 3 is a rear elevation of a part of one of the raking devices, showing the manner of supporting the same.
Figure 4:
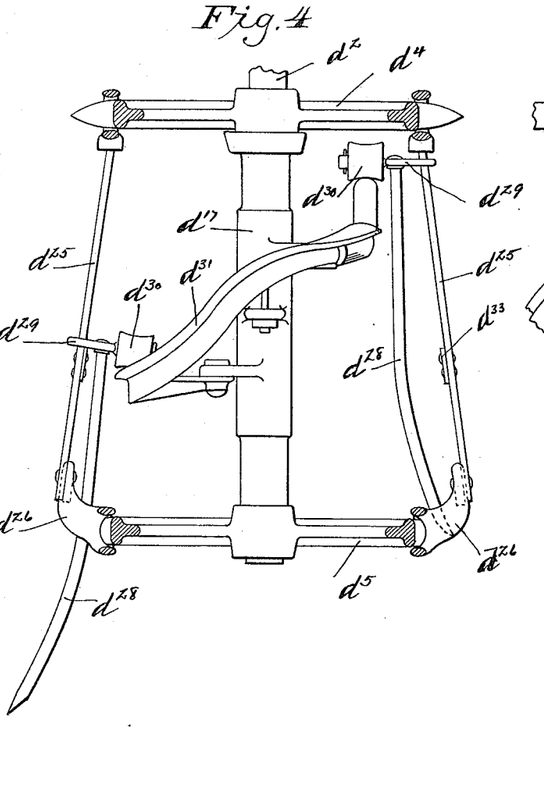
Figs. 4 and 5 are detail views of portions of the same, showing the manner of supporting and operating the raking-teeth.
Figure 5:
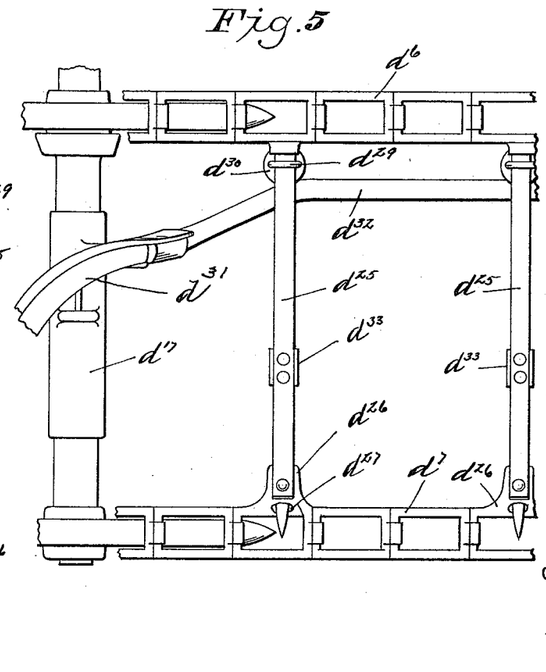
Figures 6, 7:
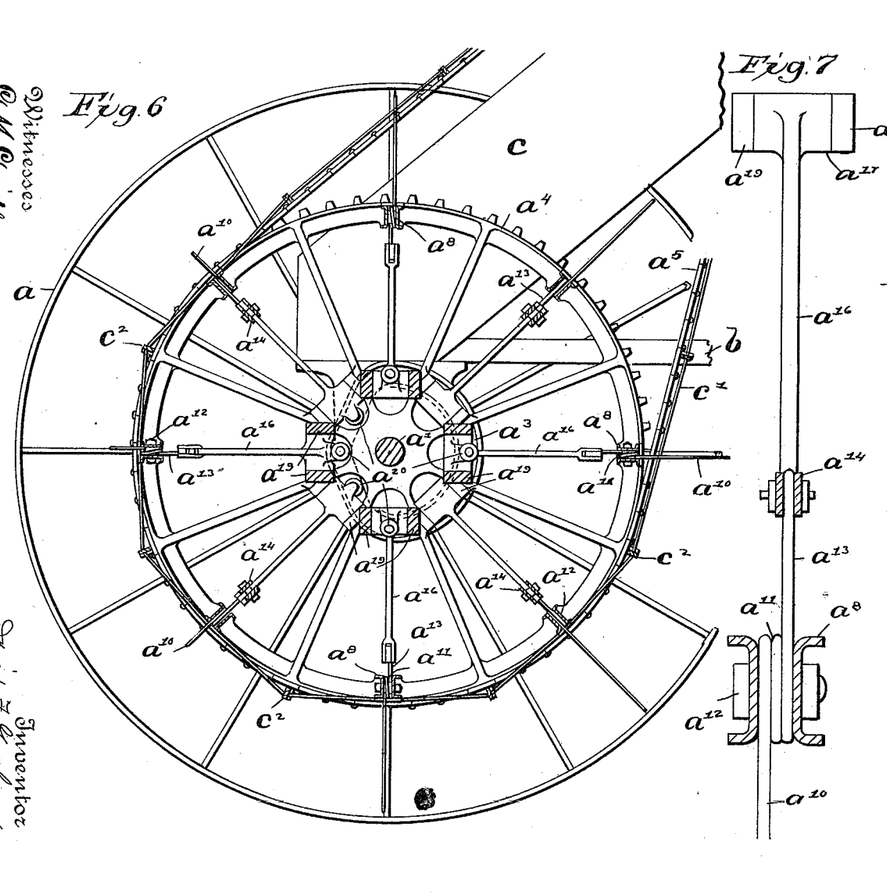
Fig. 6 is an end view, partly in section, of a portion of the cylinder and the gathering-teeth thereon.
Fig. 7 is a detail of the same.

In the said drawings, $a\ a$ represent the main driving-wheels, which are mounted on a main shaft $a'$ and connected thereto preferably by the usual clutch devices, by means of which the shaft may be caused to turn with the wheels or the wheels turn loosely thereon in the usual well-known manner. The main shaft $a'$ is supported at each end on bearings $a^2$, which are preferably formed integral with cams $a^3\ a^3$, which are supported on and bolted rigidly to the main frame $b$. (See Fig. 1.)

Figure 8:
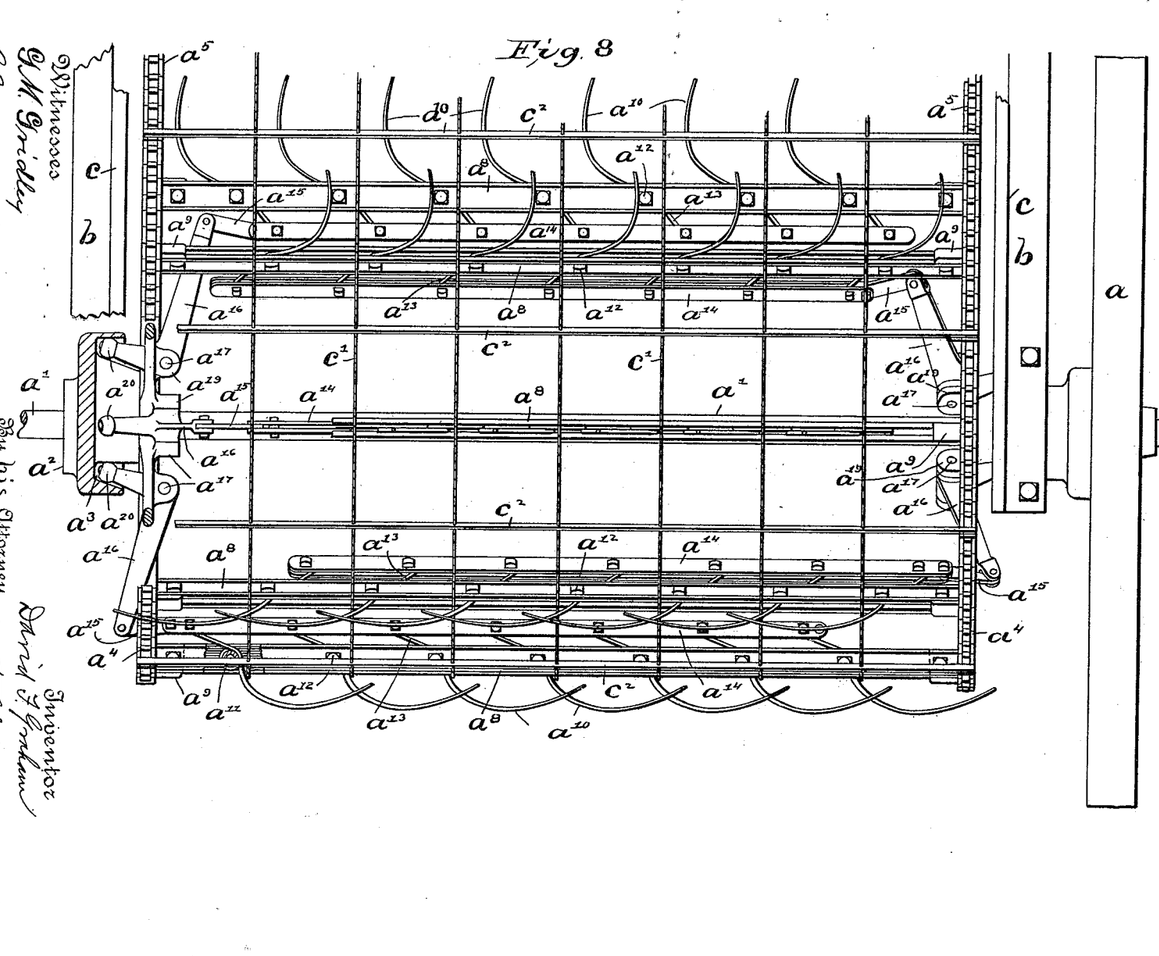
Fig. 8 is a plan of the same, some of the part being broken away and shown in section.
Figure 9:
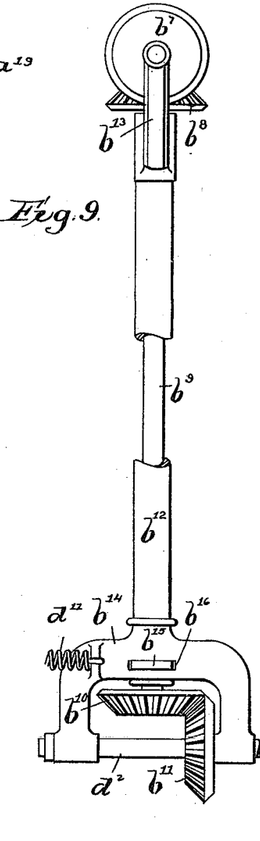
Fig. 9 is a detail view of part of the rake driving mechanism.

Mounted upon the main shaft, just inside of the cams $a^3$, are sprocket-wheels $a^4$, which carry the drive-chains $a^5$ of the elevator or carrier, which extends upwardly and forwardly at an angle in the carrier-frame $c$ in the usual manner, the drive-chains $a^5$ being supported at the top on the usual sprocket-supporting wheels $a^6$, mounted at the upper end of the frame $c$ on a transverse shaft $a^7$. The sprocket-wheels $a^4$ are connected together at intervals by transverse bars $a^8$, which extend from one sprocket-wheel to the other and are bolted at each end to projecting lugs $a^9$ on the inner faces of said sprocket-wheels, as shown in Fig. 8. The transverse bars $a^8$, which are preferably formed of channel-iron, are arranged in pairs, each one of a pair being bolted on opposite sides of the lugs $a^9$. The sprocket-wheels and their connecting-bars form the cylinder around which the carrier passes in the usual manner, the carrier being of a well-known type, which consists of endless ropes $c'$, on which are threaded transverse slats $c^2$, which slats are connected at their ends to the drive-chains $a^5$.

Arranged between the bars $a^8$ of each pair is a series of curved teeth $a^{10}$, each of which is preferably formed of a single piece of wire having a coil $a^{11}$, which is journaled between the bars on a bolt $a^{12}$, extending from one bar to the other and forming a pivot for the tooth $a^{10}$, said tooth being further provided with an inwardly-extending arm $a^{13}$, which is pivotally connected to a vibrating bar $a^{14}$, which connects all the teeth together. Each of the bars $a^{14}$ is connected at one end by a link connection $a^{15}$ to a bell-crank lever $a^{16}$, which is pivoted at $a^{17}$ between suitable supporting lugs or bearings $a^{19}$, formed on the sprocket-wheels $a^4$. These bell-crank levers $a^{16}$ are provided at their other extremities with anti-friction-rollers $a^{20}$, which engage in the cam-grooves of the cams $a^3$. Each alternate bar $a^{14}$ is connected to a bell-crank lever at opposite ends of the cylinder, so that half of said bars are operated by one cam and the other half by the other cam, the construction being such that as the cylinder revolves the bell-crank levers are operated by the cams so as to produce a vibratory movement of the bars $a^{14}$, so as to turn the teeth $a^{10}$ about their pivotal supports and cause them to be extended from the bars $a^8$ or to be closed against said bars and the carrier which passes around the same. It will be understood that this movement of the teeth is a lateral movement; that is to say, it extends across the line of travel of the cylinder as the cylinder revolves, and is for the purpose of gathering up the hay and holding it against the cylinder while the cylinder revolves, the teeth being so arranged and in such proximity to each other that every part of the surface under the cylinder will be traversed by at least one of the teeth.

Extending outwardly from each side of the frame $b$ are the gathering-rakes $d$, each of which consists of a frame $d'$, having at each end vertical shafts $d^2$ $d^3$, carrying sprocket-wheels $d^4$ $d^5$ and endless chains $d^6$ $d^7$. Means are provided by which these raking-frames are supported yieldingly, so as to rest lightly in contact with the ground and yield upwardly to pass over obstructions. This I accomplish as follows: On the main frame $b$ and in front of the cylinder is a transverse shaft $b'$, which carries suitable sprocket-wheels $b^2$ to engage with the main driving-chains $a^5$. This shaft is also further provided at each end with a sprocket-wheel $b^3$, which carry chains $b^4$, which engage with and drive sprocket-wheels $b^5$ on a counter-shaft $b^6$, also extending across the frame near the front thereof. The counter-shaft $b^6$ carries a beveled gear $b^7$ for each of the rakes $d$, it being understood that two are employed, one on each side of the machine. This beveled gear $b^7$ meshes with a similar gear $b^8$ on a shaft $b^9$, which extends backwardly with the frame $b$ and carries a beveled gear $b^{10}$, which meshes with a similar gear $b^{11}$ on the vertical shaft $d^2$ of the rake $d$.

Figures 10, 11:
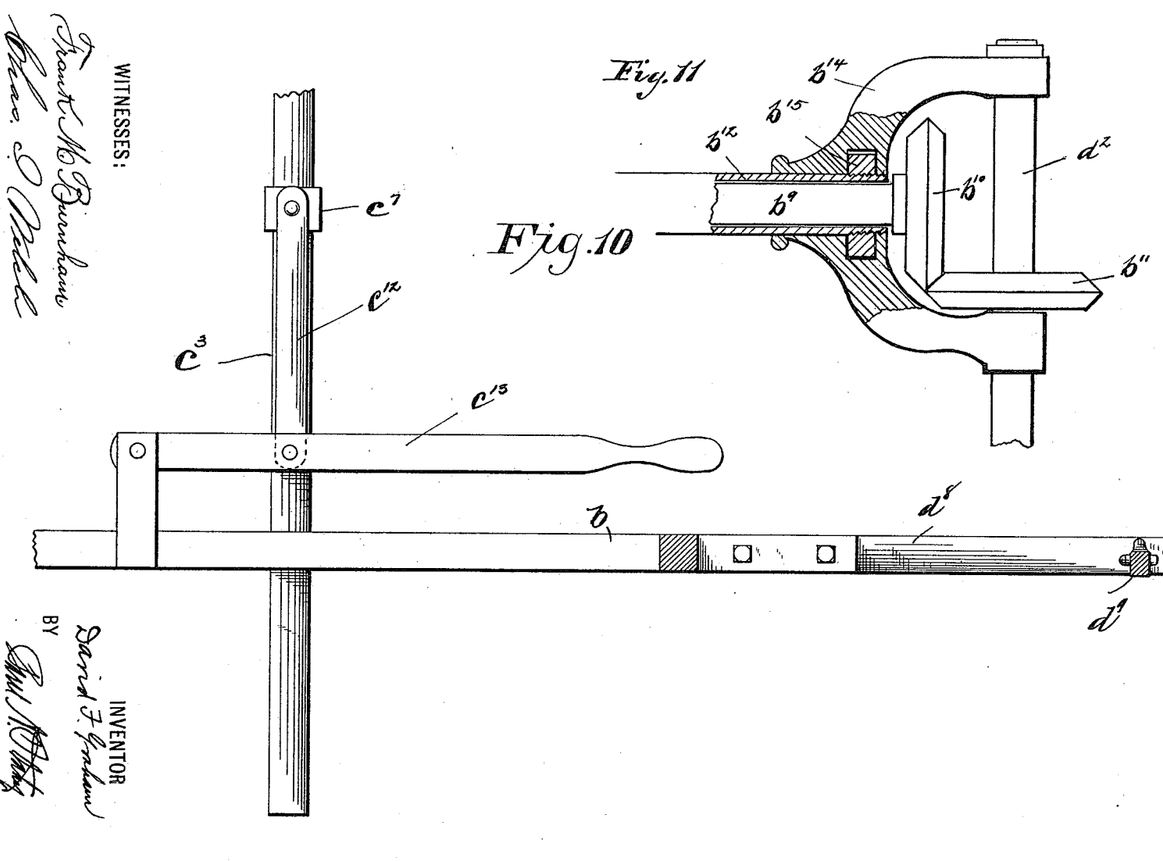
Fig. 10 is an elevation of the hitching device.
Fig. 11 is a sectional view of part of the rake driving mechanism in detail.

The shaft $b^9$ is supported in a pipe-box $b^{12}$, which is connected at each end to bifurcated frames $b^{13}$ and $b^{14}$, each of which is journaled on the respective shafts $b^6$ and $d^2$, the construction being such that said shafts $b^6$ and $d^2$ are held at a fixed distance apart, but the shaft $d^2$ or the raking-frame of which it forms a part is permitted to rise and fall in the arc of a circle whose center is at the center of the shaft $b^6$ by reason of the fact that the frame $b^{13}$ is journaled on said shaft. The bifurcated frame $b^{14}$ is also journaled on said pipe-box $b^{12}$, so that the raking-frame may be turned to any position about the shaft $b^9$. This is preferably accomplished as shown in Fig. 11, the bifurcated frame $b^{14}$ being journaled on the box $b^{12}$, which is screw-threaded and adapted to receive a screw-threaded collar $b^{15}$, which fits in a slotted opening $b^{16}$ in the bifurcated frame $b^{14}$, the construction being such that the frame $b^{14}$ may turn about the box $b^{12}$, but is held against lateral movement thereon.

Extending outwardly from each side of the frame $b$ in front is a bar $d^8$, to which is hinged the front end of a curved supporting-bar $d^9$, the rear end of which is supported by a carrying-wheel $d^{10}$, which is journaled on a suitable bearing in the end of said bar. The rake $d$ is supported at or near each end by springs $d^{11}$ $d^{12}$, the former of which is connected at one end to the frame $b^{14}$ of the driving mechanism and at the other to the carrier-frame $c$, the other spring being connected at its lower end to the frame $d'$ and at its upper end to a screw-threaded bar or rod $d^{13}$, which passes through a suitable bearing $d^{14}$ on the curved supporting-bar $d^9$, and provided with an adjusting-nut $d^{15}$, preferably formed with a handle $d^{16}$, by means of which the tension of said spring may be adjusted as desired. The frame $d'$ of the rake $d$ consists of pipe-boxes $d^{17}$ and $d^{18}$ and connecting-bars $d^{19}$ and $d^{20}$, the said pipe-boxes being provided on opposite sides with projecting lugs $d^{21}$ $d^{22}$ and the bars $d^{19}$ $d^{20}$ being reduced and screw-threaded and passed through said lugs $d^{21}$ $d^{22}$, adjusting-nuts $d^{23}$ $d^{24}$ being provided on each side of said lugs so that the said pipe-boxes may be readily adjusted with reference to said bars to bring said pipe-boxes in perfect alinement or to vary the distance between the same, as desired, the pipe-boxes being adapted to support the vertical shafts $d^2$ $d^3$, over which the raking-chains run.

At suitable intervals the sprocket-chains $d^6$ $d^7$ are connected by bars $d^{25}$, which bars are secured at each end to the links of the respective chains, which are formed with suitable projections to support the same. The projections on the lower chain $d^7$ are extended outwardly from the chain, while those on the upper chain $d^6$ are substantially in line therewith, thus causing the bars $d^{25}$ to stand at an angle. These lower projections $d^{26}$ are also formed with perforations $d^{27}$, through which the movable raking-teeth $d^{28}$ are adapted to be projected and withdrawn in the manner hereinafter described. These raking-teeth $d^{28}$ are supported at their upper end by loop-supporting devices $d^{29}$, which are threaded on the bars $d^{25}$ at one end and at the other provided with cam-rollers $d^{30}$. These cam-rollers $d^{30}$ are adapted, as the chains are revolved, to come in contact with a cam $d^{31}$, which is supported on the pipe-box $d^{17}$ on the inner end of the rake. The cam $d^{31}$ is connected at one end to a cam-rod $d^{32}$, which extends outwardly on the rear side of the rake to a point in proximity to the outer pipe-box $d^{18}$.

Each of the bars $d^{25}$ is provided with a stop $d^{33}$, against which each of the supporting-pieces $d^{29}$, when its roller $d^{30}$ is not in contact with the cam $d^{31}$ or the rod $d^{32}$, rests. The raking-teeth $d^{28}$ are curved slightly, so that as they are raised vertically by the contact of the rollers $d^{30}$ with the cam $d^{31}$ they are drawn upwardly and backwardly through the perforations $d^{27}$ in the lower supports $d^{26}$.

The carrier-frame $c$ is supported from the main frame $b$ at the front by a vertical post $c^3$. This post $c^3$ is extended below the main frame $b$ and is provided at the bottom with a hinged extension $c^4$, having a base or foot $c^5$ and hinged at $c^6$, so as to be turned to a vertical position and form a continuation of the post $c^3$, or turned upwardly out of the way, this extension being adapted to form a support for the front end of the frame when the machine is not in use. There is journaled on the post $c^3$ a sleeve $c^7$, which is connected by a link $c^8$ to a hitching-bar $c^9$, which is provided at its outer end with a hook $c^{10}$ and hinged at $c^{11}$ to the front of the frame $b$. The sleeve $c^7$ is further connected by a link $c^{12}$ to a hand-lever $c^{13}$, so that by a movement of the hand-lever the hitching-bar $c^{10}$ may be raised or lowered about its hinged connection $c^{11}$ as desired, the construction being such that by operating the hand-lever $c^{13}$ the hook $c^{10}$ on the hitching-bar may be caused to engage with the proper device on the wagon or other vehicle to which the rake is to be attached in operation.

A brief description of the operation of the machine is as follows: The device being attached in the usual manner to the back end of a wagon or other vehicle is drawn forward. The cylinder is caused to revolve with the main driving-wheels, and, as each pair of bars $a^8$ on said cylinder approaches the lowest point of its revolution, the teeth, operated by the cams, are caused to sweep across the path of the loader and to gather the hay from the ground and bind it closely against the carrier, which is passing around the cylinder. Each alternate set of teeth is reciprocated in the opposite direction, so that the hay is gathered from opposite sides substantially the same as by the fingers of a person using both hands. The teeth remain in this position and thus clamp the hay to the cylinder while the cylinder makes substantially a half-revolution, when the cam again operating on the bell-cranks cause the teeth to be extended just as the carrier begins to leave the cylinder in passing upwardly through the carrier-frame $c$. The teeth remain extended during the remaining half of the revolution, so that the hay is discharged therefrom and passes up along the carrier and is deposited on the load in the usual manner. The side rakes, driven by the gearing heretofore described, cause the rake-chains $d^6$ $d^7$ to revolve about their sprocket-wheels with the forward strands of said chains moving inwardly. The rake-teeth supported by said chains are each raised by the cams $d^{31}$ as they approach the limit of their inward movement, and being drawn upwardly and backwardly discharge the hay carried thereby into the path of the loading-cylinder. The teeth are retained in this position by means of the cam and the cam-rod $d^{32}$ until just prior to the time that they reach the outer sprocket-wheels $d^5$, when they are discharged from the cam-rod $d^{32}$ and drop to the raking position and pass around the sprocket-wheels in this position so as to gather in the hay which lies under said sprocket-wheel and carry it around in front of said sprocket-wheels, and thus inwardly to the point of discharge as before. The placing of the teeth in their operative position prior to the time they pass around the outer sprocket-wheels makes a complete separation of the hay to be raked from the unraked portion. The raking-frames, being supported by the springs, rest lightly in contact with the ground, the tension of the springs being so adjusted that practically the entire weight of the raking-frames is supported from the springs, so that the frames will yield upwardly in passing over any obstruction. The pipe-box which connects the raking-frame to the counter-shaft $b^6$ extends at an angle to the ground line in the normal position. Whenever the raking-frame is raised, therefore, about its pivotal center, the lower portion of the raking-frame, traveling in a circular path with a greater radius than the upper part of the frame, will cause the frame to be tipped slightly and inclined backwardly as it rises, thus permitting any obstruction to be more readily discharged therefrom.

Having thus described my invention, I claim—

1. In a hay-loader, a main frame and a carrier, main driving-wheels supported on said main frame, and a cylinder connected to said driving-wheels, said cylinder being provided with hinged teeth whose axes are substantially in line with the forward movement of said cylinder, and means as described for vibrating said teeth to cause them to sweep across the path of said cylinder, substantially as specified.

2. The combination, in a loader, of a cylinder, a carrier passing around said cylinder, and means for driving said cylinder as the loader advances, transverse bars forming the periphery of said cylinder, and teeth hinged to said bars, stationary cams in proximity to said cylinder, and a connection from said cams to said teeth whereby said teeth are caused to move across the path of said cylinder as said cylinder is revolved, substantially as specified.

3. In a hay-loader, an endless carrier, and a revolving cylinder over which said carrier travels, hinged teeth arranged in series on the periphery of said cylinder, all of said teeth being adapted when moved to travel across the path of said cylinder, and each alternate series moving in opposite directions, and means as described for causing said teeth to vibrate across the path of said cylinder in opposite directions, substantially as specified.

4. The combination with a main axle, of sprocket-wheels thereon, driving-chains passing over said sprocket-wheels, and carrier-slats connected to said driving-chains, transverse bars arranged in pairs connected at each end to said sprocket-wheels so as to form a cylinder as described, hinged teeth arranged between the respective pairs of bars, as described, a vibrating bar connected to all the teeth of a series, a cam-lever connected to said vibrating bar, and a cam for operating said lever, substantially as specified.

5. The combination with the sprocket-wheels, transverse bars connected to the same, and hinged teeth arranged between said bars, each of said teeth being formed of a single piece with a coil through which its supporting-journal passes, and an inwardly-extending arm connected to a vibrating bar which is similarly connected to all the teeth of the series, and means, as described, for vibrating said bar as the sprocket-wheels are revolved to cause said teeth to move across the path of said transverse bars, substantially as specified.

6. In a hay-loader having side rakes as described, a raking-frame carrying said side rakes which consists of endless chains having raking-teeth thereon, an auxiliary support hinged to the loader-frame, and independent springs from said loader-frame and said auxiliary support, respectively, to said raking-frame, and means for driving said raking-frame independent of said support whereby said raking-frame is yieldingly supported at each end to permit it to yield independently at either end, substantially as specified.

7. The combination with the main frame and driving-wheels, of a laterally-extending raking-frame having endless chains and raking-teeth, as described, a counter-shaft on the main frame geared to said driving-wheels, and a hinged driving connection from said counter-shaft to said raking-frame, a yielding connection between said main frame and said raking-frame, and an auxiliary support connected to said main frame, and a yielding connection from said auxiliary support to said raking-frame whereby said raking-frame is yieldingly supported at each end by independent supports and is adapted to turn about its hinged driving connection, substantially as specified.

8. The combination with a main frame, and a raking-frame extending laterally therefrom, a hinged driving connection from said main frame to said raking-frame, and a spring for yieldingly supporting said raking-frame at a point adjacent to said driving connection, a hinged supporting-bar extending over said raking-frame and connected to said main frame, and a spring from said supporting-bar to said raking-frame, substantially as specified.

9. The combination with a main frame, and a laterally-extending raking-frame consisting of endless chains having raking-teeth as described, a hinged connection from said main frame to said raking-frame to permit said raking-frame to rise vertically as described, a supporting-bar arranged above said raking-frame, and independent springs connected to said raking-frame from said bar and said main frame at different points in the length of said raking-frame to permit said raking-frame to rise independently at either end, substantially as specified.

10. The combination, in a hay-loader, with the main frame, main driving-wheels and a carrier operated thereby, a raking-frame extending laterally from said main frame having endless chains and raking-teeth adapted to discharge in the path of said loader, spring-supports at opposite ends of said raking-frame, and means as described for connecting said raking-frame to said main frame which will permit said raking-frame to yield independently at either end, substantially as specified.

11. The combination of a raking-frame, of endless chains supported thereby, connecting-bars connecting the respective chains at intervals, as described, raking-teeth having supports which travel on said bars, and a cam adapted to engage said supports so as to operate said raking-teeth, substantially as specified.

12. The combination with the raking-frame, and endless chains supported at the top and bottom of said raking-frame, connected bars extending between the respective chains as described, raking-teeth having supports which travel on said bars, and means for raising said raking-teeth on said bars, said bars being arranged at an angle to the plane of said raking-frame whereby said teeth are caused to be moved backwardly when raised along said bars, substantially as specified.

13. The combination with the raking-frame, and the endless chains at the top and bottom of the same, connecting-bars at an angle to the plane of said frame, raking-teeth adapted to travel along said bars and supported at the lower ends in suitable bearings on the lower supporting-chain, and a cam projection on each of said raking-teeth, and a cam on said raking-frame to cause said teeth to be successively raised during a portion of the revolution of said chains, substantially as specified.

14. The combination with a raking-frame consisting of the connected pipe-boxes as described, a cam on one of said pipe-boxes, of a cam-rod connected to said cam and extending for a portion of the length of said raking-frame, raking-teeth movably connected to endless chains which are supported on said raking-frame, and cam projections on said raking-teeth to engage said cam and cause said teeth to be elevated and held in an elevated position during a portion of the revolution of said chains, substantially as specified.

15. The combination with a main frame, and a raking-frame hinged thereto, a laterally-extending bar at the front of said main frame, and a curved backwardly-extending supporting-bar hinged to said lateral frame extension, a carrying-wheel at the end of said bar, a connection from said bar to a spring which is connected at the other end to said raking-frame, and means for adjusting said spring with reference to said supporting-bar, substantially as specified.

16. The combination with a main frame, a carrier-frame, a central supporting-post on said main frame, a hinged hitching-bar, a sliding sleeve on said post, and a link connection from said sliding sleeve to said hitching-bar, and means for raising and lowering said sleeve, substantially as specified.

17. The combination with a hinged hook-shaped hitching-bar, and a vertical traveling sleeve, a hand-lever connected to said sleeve, and a link connecting said sleeve and hitching-bar, substantially as and for the purpose specified.

In testimony whereof I have hereunto set my hand this 18th day of April, A. D. 1895.

DAVID F. GRAHAM.

Witnesses:
 CHARLES H. BARROWS,
 NORA H. GRAHAM.